(12) United States Patent
Axelsson et al.

(10) Patent No.: US 9,082,184 B2
(45) Date of Patent: Jul. 14, 2015

(54) NOTE RECOGNITION AND MANAGEMENT USING MULTI-COLOR CHANNEL NON-MARKER DETECTION

(71) Applicant: 3M INNOVATIVE PROPERTIES COMPANY, St. Paul, MN (US)

(72) Inventors: Pontus Axelsson, Stockholm (SE); Roland Persson, Stockholm (SE); Emre Berge Ergenekon, Solna (SE); Linus Åkerlund, Johanneshov (SE)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

(21) Appl. No.: 14/514,607

(22) Filed: Oct. 15, 2014

(65) Prior Publication Data

US 2015/0104098 A1 Apr. 16, 2015

Related U.S. Application Data

(60) Provisional application No. 61/891,676, filed on Oct. 16, 2013.

(51) Int. Cl.
  *G06K 9/34* (2006.01)
  *G06T 7/00* (2006.01)
  *G06K 9/46* (2006.01)
  *G06T 7/40* (2006.01)

(52) U.S. Cl.
  CPC ............ *G06T 7/0051* (2013.01); *G06K 9/4604* (2013.01); *G06T 7/408* (2013.01)

(58) Field of Classification Search
  None
  See application file for complete search history.

(56) References Cited

U.S. PATENT DOCUMENTS

| 5,319,745 | A  | 6/1994  | Vinsonneau |
| 5,465,165 | A  | 11/1995 | Tanio      |
| 5,590,219 | A  | 12/1996 | Gourdol    |
| 5,898,434 | A  | 4/1999  | Small      |
| 6,351,559 | B1 | 2/2002  | Zhou       |
| 6,721,733 | B2 | 4/2004  | Lipson     |

(Continued)

FOREIGN PATENT DOCUMENTS

| EP | 1182861   | 2/2002 |
| JP | 2009-20813 | 1/2009 |

(Continued)

OTHER PUBLICATIONS

Semmlow, "Chapter 12 Image Segmentation" in: Biosignal and Medical Image Processing, Taylor & Francis, Jan. 14, 2004, pp. 343-372).*

(Continued)

*Primary Examiner* — Matthew Bella
*Assistant Examiner* — Jason Heidemann
(74) *Attorney, Agent, or Firm* — X. Christina Huang

(57) ABSTRACT

Techniques are described for creating and manipulating software notes representative of physical notes. A computing device comprises a processor and a note identification module executable on the processor and configured to separate an input image into a plurality of channelized input images. Each of the channelized input images are associated with a different color. The note identification module is configured to apply edge detection and feature extraction to identify polygons within each of the channelized input images and select, from the polygons from the channelized input images, a representative polygon for each of the physical notes in the input image.

25 Claims, 7 Drawing Sheets

(56) References Cited

U.S. PATENT DOCUMENTS

| | | | |
|---|---|---|---|
| 7,072,512 B2 | 7/2006 | Mehrotra | |
| 7,343,415 B2 | 3/2008 | Kenner | |
| 7,561,310 B2 | 7/2009 | Joyce | |
| 7,573,598 B2 | 8/2009 | Cragun | |
| 7,774,479 B2 | 8/2010 | Kenner | |
| 7,837,094 B2 | 11/2010 | Rhoads | |
| 8,069,173 B2 | 11/2011 | Munekuni | |
| 8,113,432 B2 | 2/2012 | Kimura | |
| 8,139,852 B2 | 3/2012 | Shinjo | |
| 8,238,666 B2 | 8/2012 | Besley | |
| 8,256,665 B2 | 9/2012 | Rhoads | |
| 8,380,040 B2 | 2/2013 | Carter | |
| 8,416,466 B2 | 4/2013 | Takata | |
| 8,429,174 B2 | 4/2013 | Ramani | |
| 8,457,449 B2 | 6/2013 | Rhoads | |
| 8,503,791 B2 | 8/2013 | Conwell | |
| 8,542,889 B2 | 9/2013 | Sarnoff | |
| 8,543,926 B2 | 9/2013 | Giles | |
| 8,558,913 B2 | 10/2013 | Pillman | |
| 8,600,167 B2 | 12/2013 | Showering | |
| 8,655,068 B1 | 2/2014 | Li | |
| 2004/0017400 A1 | 1/2004 | Ly | |
| 2005/0091578 A1 | 4/2005 | Madan | |
| 2006/0039045 A1 | 2/2006 | Sato | |
| 2006/0077468 A1 | 4/2006 | Loce | |
| 2006/0221357 A1 | 10/2006 | Uzawa | |
| 2007/0089049 A1 | 4/2007 | Gormish | |
| 2007/0110277 A1 | 5/2007 | Hayduchok | |
| 2007/0176780 A1 | 8/2007 | Hart | |
| 2007/0274561 A1* | 11/2007 | Rhoads et al. | 382/100 |
| 2008/0021701 A1 | 1/2008 | Bobick | |
| 2008/0075364 A1 | 3/2008 | Speigle | |
| 2010/0023878 A1 | 1/2010 | Douris | |
| 2010/0096452 A1 | 4/2010 | Habraken | |
| 2010/0191772 A1 | 7/2010 | Brown | |
| 2010/0202680 A1 | 8/2010 | Hamasaki | |
| 2011/0066658 A1 | 3/2011 | Rhoads | |
| 2011/0164815 A1 | 7/2011 | Sharma | |
| 2011/0187731 A1 | 8/2011 | Tsuchida | |
| 2011/0285123 A1 | 11/2011 | Wittke | |
| 2012/0014456 A1 | 1/2012 | Martinez Bauza | |
| 2012/0151577 A1 | 6/2012 | King | |
| 2012/0320410 A1 | 12/2012 | Kakegawa | |
| 2012/0324372 A1 | 12/2012 | Kowalkiewicz | |
| 2013/0054636 A1 | 2/2013 | Tang | |
| 2013/0163047 A1 | 6/2013 | Miyamoto | |
| 2013/0217440 A1 | 8/2013 | Lord | |
| 2013/0227476 A1 | 8/2013 | Frey | |
| 2013/0258117 A1 | 10/2013 | Penov | |
| 2013/0258122 A1 | 10/2013 | Keane | |
| 2013/0271784 A1 | 10/2013 | Nakajima | |
| 2014/0024411 A1 | 1/2014 | Rao | |
| 2014/0050398 A1* | 2/2014 | Pashintsev et al. | 382/167 |
| 2014/0050409 A1* | 2/2014 | Constantinou et al. | 382/195 |
| 2014/0056512 A1 | 2/2014 | Lerios | |
| 2014/0282077 A1 | 9/2014 | Wilson | |
| 2014/0294236 A1 | 10/2014 | Biller | |
| 2014/0297646 A1 | 10/2014 | Bastiaens | |

FOREIGN PATENT DOCUMENTS

| | | |
|---|---|---|
| JP | 2011-90486 | 5/2011 |
| WO | WO 2012-070935 | 5/2012 |
| WO | WO 2013-085512 | 6/2013 |
| WO | WO 2013-184767 | 12/2013 |
| WO | WO 2014-165438 | 10/2014 |

OTHER PUBLICATIONS

Klemmer et al."Papier-Mâché: Toolkit Support for Tangible Input", Apr. 24-29, 2004, ACM.*

Sinkov,"Evernote Gives Iconic Post-It Notes a Digital Life", Sep. 26, 2013, [online] Evernote Blog Evernote Gives Iconic Post-it Notes a Digital Life Comments, [ retrieved on Nov. 23, 2014].*

Klemmer et al., Integrating Physical and Digital Interactions on Walls for Fluid Design Collaboration, 2008, Human-Computer Interaction, vol. 23, pp. 138-213.*

Boykov, "Graph Cuts and Efficient N-D Image Segmentation", International Journal of Computer Vision, 2006, vol. 70, No. 2, pp. 109-131.

Davidson, "Calculation of Color Differences From Visual Sensitivity Ellipsoids", Journal of the Optical Society of America, Dec. 1951, vol. 41, No. 12, pp. 1052-1055.

Everitt, "Two Worlds Apart: Bridging the Gap Between Physical and Virtual Media for Distributed Design Collaboration", CHI 2003, Apr. 5-10, 2003, 8 pages.

Felzenszwalb, "Efficient Graph-Based Image Segmentation", International Journal of Computer Vision, 2004, vol. 59, No. 2, pp. 167-181.

Fisher, "Change Detection in Color Images", Proceedings of 7th IEEE Conference on Computer Vision and Pattern, 1999, 6 pages.

Frome, "Visibility of Borders: Separate and Combined Effects of Color Differences, Luminance Contrast, and Luminance Level", J. Opt. Soc. Am., Feb. 1981, vol. 71, No. 2, pp. 145-150.

Geyer, "Experiences From Employing Evernote as a Tool for Documenting Collaborative Design Processes", Conference on Designing Interactive System DIS 2012, Workshop on Supporting Reflection in and on Design Processes, Jun. 12, 2012, 2 pages.

Gur, "Isoluminant Stimuli May Not Expose the Full Contribution of Color to Visual Functioning: Spatial Contrast Sensitivity Measurements Indicate Interaction Between Color and Luminance Processing", Vision Research, Jul. 7, 1992, vol. 32, No. 7, pp. 1253-1262.

Hsieh, "Peripheral Display of Digital handwritten notes", CHI Proceedings of the SIGCHI Conference on Human Factors in Computing Systems, Apr. 22-27, 2006, pp. 285-288.

"King jim Shot Note", [Online], [retrieved from internet on Sep. 17, 2014], URL :<http://www.kingjim.co.jp/english/products/shotnote/>, 2 pages.

Klemmer, "The Designers Outpost: A Tangible Interface for Collaborative Web Site Design", In Proceedings of UIST, 2001, 10 pages.

K-SVD, "An Algorithm for Designing Overcomplete Dictionaries for Sparse Representation", IEEE Transactions on Signal Processing, Nov. 2006, vol. 54, No. 11, pp. 4311-4322.

Masaoka, "Fast and Accurate Model for Optimal Color Computation", Optics Letters, Jun. 15, 2010, vol. 35, No. 12, pp. 2031-2033.

Mika, "Fisher Discriminant Analysis With Kernels", Neural Networks for Signal Processing IX, 1999. Proceedings of the 1999 IEEE Signal Processing Society Workshop in Neural Networks for Signal Processing IX, 1999. Proceedings of the 1999 IEEE Signal Processing Society Workshop, Aug. 1999, pp. 41-48.

Rajala, "Visual Sensitivity to Color-Varying Stimuli", Human Vision, Visual Processing and Digital Display III, Proc. SPIE. Aug. 27, 1992, vol. 1666, pp. 375-386.

Sharma, "The CIEDE2000 Color Difference Formula: Implementation Notes, Supplementary Test Data, and Mathematical Observations", Color Research & Application, Feb. 2005, vol. 30, No. 1, pp. 21-30.

Yang, "Photonic Crystal Changes Color When Exposed to an Explosion", Nanotechnology, SPIE Inetrnational Year of Light 2015, Apr. 25, 2011, [online], [retrieved from Internet on Sep. 18, 2014], URL:<http://spie.org/x47872.xml?pf=true&ArticleID=x47872>, 3 pages.

Imaging With QuickDraw, Apple Computer, Inc., Inside Macintosh, 1994, [retrieved from the internet on Dec. 14, 2014], <URL https//developer.apple.com/legacy/library/documentation/mac/pdf/ImagingWithQuickDraw.pdf>, Chapters 1, 3 and 4, pp. 1-17 through 1-20, 3-4 through 3-14 and 4-4 through 4-17, 51 pages.

QuickDraw, Wikipedia, Oct. 3, 2013, [retrieved from the internet on Dec. 14, 2014], <URL http/en.wikipedia.org/wiki/QuickDraw> See "Graphics primitives" section, 4 pages.

* cited by examiner

NOTE RECOGNITION AND MANAGEMENT USING MULTI-COLOR CHANNEL NON-MARKER DETECTION

This application claims the benefit of U.S. Provisional Application No. 61/891,676, filed Oct. 16, 2013, the entire content of which is incorporated by reference herein in its entirety.

TECHNICAL FIELD

The present disclosure relates to note content capturing, recognition, extraction, and/or management tools and systems.

BACKGROUND

Paper notes have been broadly used in recording, sharing, and communicating ideas and information. For example, during a collaboration session (e.g., brainstorming session), participants write down ideas on Post-It® notes, whiteboard, or paper, and then share with one another. In addition, people commonly use notes throughout the day to memorialize information or content which the individual does not want to forget. As additional examples, people frequently use notes as reminders of actions or events to take in the future, such as to make a telephone call, revise a document or to fill out a time sheet.

For example, in many situations people participate in a collaboration session by writing information on paper-based notes, such as Post-It® notes. Paper Post-It® notes can readily be removed from a dispenser pad of sticky-back paper Post-It® notes and applied to various surfaces, such as whiteboards, documents, the tops of desks, telephones, or the like. Information can be written on paper Post-It® notes either before or after the paper Post-It® notes are detached from their dispenser pad or attached to their target surfaces. Paper Post-It® notes can be easily moved from one surface to another, such as between documents or between documents and the tops of desks, they can overlap edges or boundaries of documents, they can be layered, and they can be moved with the objects to which they are attached.

Software programs currently exist which permit computer users to generate software-based notes in digital form and to utilize the digital notes within computing environments. For example, a computer user may create digital notes and "attach" the digital notes to an electronic document, a desktop, or an electronic workspace presented by the computing environment. The computer user may manipulate the notes, allowing the notes to be created, deleted, edited, saved, and selectively viewed. The computer user may move such a note within a document, or between documents and/or the desktop, by cutting the note from a document, storing the note in a clipboard, and then pasting the note to another area of the same document or to a different document. In this way, the software programs provide a virtual representation of notes and allow an individual to utilize the digital notes in a manner similar to physical notes that he or she may use on a daily basis.

SUMMARY

In general, the disclosure describes techniques for creating and manipulating software notes representative of physical notes.

In one example, a method comprises receiving an input image of an environment having a plurality of physical notes and separating the input image into a plurality of channelized input images, each of the channelized input images associated with a different color. The method further comprises generating a plurality of transformed channelized input images by applying edge detection to each of the plurality of channelized input images, processing the plurality of transformed channelized input images to identify, based on edges detected within the transformed channelized input images, a plurality of polygons corresponding to the physical notes within the input image. In addition, the method includes grouping the plurality of polygons from the plurality of transformed channelized input images into a plurality of groups, each of the groups comprising one or more of the polygons and corresponding to different one of the physical notes, and selecting a representative one of the polygons from each of the plurality of groups. The representative one of the polygons is selected for each respective physical note in the plurality of physical notes.

A computer system configured to receive an input image of an environment having a plurality of physical notes, separate the input image into a plurality of channelized input images, each of the channelized input images associated with a different color, generate a plurality of transformed channelized input images by applying edge detection to each of the plurality of channelized input images, process the plurality of transformed channelized input images to identify, based on edges detected within the transformed channelized input images, a plurality of polygons corresponding to the physical notes within the input image, group the plurality of polygons from the plurality of transformed channelized input images into a plurality of groups, each of the groups comprising one or more of the polygons and corresponding to different one of the physical notes, and select a representative one of the polygons from each of the plurality of groups for each respective physical note in the input image.

A non-transitory computer readable medium comprising instructions for causing a programmable processor to receive an input image of an environment having a plurality of physical notes, separate the input image into a plurality of channelized input images, each of the channelized input images associated with a different color, generate a plurality of transformed channelized input images by applying edge detection to each of the plurality of channelized input images, process the plurality of transformed channelized input images to identify, based on edges detected within the transformed channelized input images, a plurality of polygons corresponding to the physical notes within the input image, group the plurality of polygons from the plurality of transformed channelized input images into a plurality of groups, each of the groups comprising one or more of the polygons and corresponding to different one of the physical notes, and select a representative one of the polygons from each of the plurality of groups for each respective physical note in the input image In another example, a computing device comprises a processor and a note identification module executable on the processor and configured to separate an input image into a plurality of channelized input images. Each of the channelized input images is associated with a different color. The note identification module is configured to apply edge detection and feature extraction to identify polygons within each of the channelized input images and to select, from the polygons from the channelized input images, a representative polygon for each of the physical notes in the input image.

DETAILED DESCRIPTION

Figure 1:
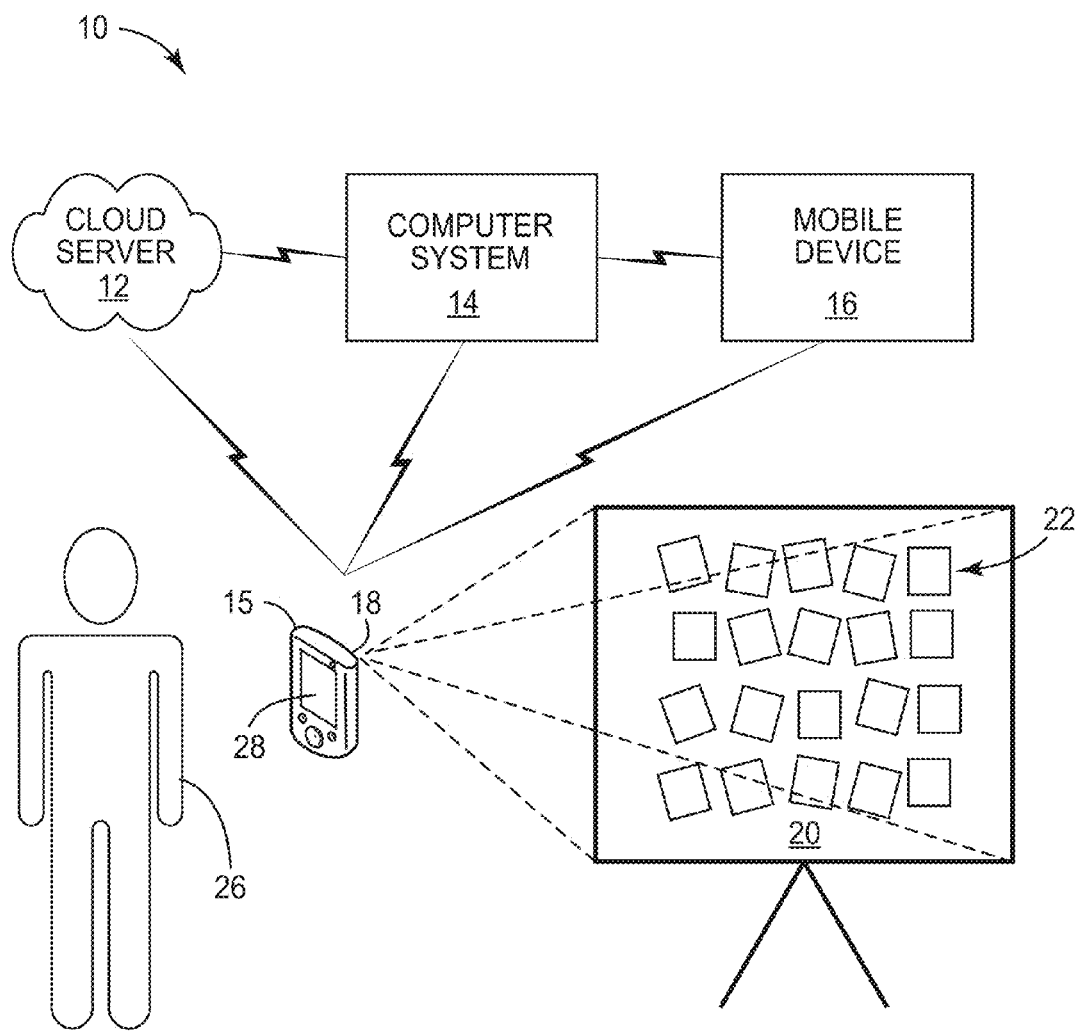
FIG. 1 is a representation illustrating one example of a user capturing an image of a workspace with notes using an image capture device on a mobile device.

The present disclosure describes techniques for creating and manipulating software notes representative of physical notes. For example, techniques are described for recognizing physical notes present within a physical environment, capturing information therefrom and creating corresponding digital representations of the physical notes, referred to herein as digital notes or software-based notes. Further, at least some aspects of the present disclosure are directed to techniques for managing multiple notes, such as storing, retrieving, editing the digital notes, categorizing and grouping the digital notes, or the like.

In general, notes can include physical notes and digital notes. Physical notes generally refer to physical objects with a general boundary and recognizable content. Physical notes can include the resulting objects after people write, draw, or enter via other type of inputs on the objects, for example, paper, white board, or other objects accepting the inputs. By way of examples, physical notes can include hand-written Post-It® notes, paper, or film, white-board with drawings, posters, and signs. In some cases, physical notes can be generated using digital techniques, e.g. printing onto printable Post-It® notes or printed document. In some cases, one object can include several physical notes. For example, several ideas can be written on separate areas of a single piece of poster paper or a white-board. In some implementations, to facilitate the recognition of these notes, marks, such as lines, shapes, colors, symbols, markers, or stickers, can be applied to the edges of the notes. Physical notes can be two-dimensional or three dimensional. Physical notes can have various shapes and sizes. For example, a physical note may be a 7.62×7.62 cm (3×3 inches) note; a physical note may be a 66.04×99.06 cm (26×39 inches) poster; and a physical note may be a triangular metal sign. In some cases, physical notes may have known shapes and/or sizes that conform to standards, such as legal, A3, A4, and other size standards, and known shapes, which may not be limited to geometric shapes, such as stars, circles, rectangles, or the like. In other cases, physical notes may have non-standardized sizes and/or irregular shapes.

Digital notes generally refer to digital objects with information and/or ideas. Digital notes can be generated using digital inputs. Digital inputs can include, for example, keyboards, touch screens, digital cameras, digital recording devices, stylus, digital pens, or the like. In some case, digital notes may be representative of physical notes.

In some cases, digital notes may be representative of physical notes used in a collaboration space. Collaboration space generally refers to a gathering area allowing more than one person to brainstorm, such as sharing ideas and thoughts with each other. The collaboration space can also represent a virtual space allowing a group of persons to brainstorm, such as sharing ideas and thoughts remotely, besides the gathering area. The collaboration space may be referred to as workspace, or the like. In other cases, workspace may generally refer to a desk and/or notebook of a single person with two or more physical notes.

FIG. 1 illustrates an example of a note recognition environment 10. In the example of FIG. 1, environment 10 includes a mobile device 15 to capture and recognize one of more notes 22 from a workspace 20. As described herein, mobile device 15 provides an execution environment for one or more software applications that, as described, can efficiently capture and extract note content from a large number of physical notes, such as the collection of notes 22 from workspace 20. In this example, notes 22 may be the results of a collaborative brainstorming session having multiple participants. As described, mobile device 15 and the software executing thereon may perform a variety of note-related operations, including automated creation of digital notes representative of physical notes 22 of workspace 20.

In the example implementation, mobile device 15 includes, among other components, an image capture device 18 and a presentation device 28. In addition, although not shown in FIG. 1, mobile device 15 may include one or more processors, microprocessors, internal memory and/or data storage and other electronic circuitry for executing software or firmware to provide the functionality described herein.

In general, image capture device 18 is a camera or other component configured to capture image data representative of workspace 20 and notes 22 positioned therein. In other words, the image data captures a visual representation of an environment, such as workspace 20, having a plurality of visual notes. Although discussed as a camera of mobile device 15, image capture device 18 may comprise other components capable of capturing image data, such as a video recorder, an infrared camera, a CCD (Charge Coupled Device) array, a laser scanner, or the like. Moreover, the captured image data can include at least one of an image, a video, a sequence of images (i.e., multiple images taken within a time period and/or with an order), a collection of images, or the like, and the term input image is used herein to refer to the various example types of image data.

Presentation device 28 may include, but not limited to, an electronically addressable display, such as a liquid crystal display (LCD) or other type of display device for use with mobile device 28. In some implementations, mobile device 15 generates the content to display on presentation device 28 for the notes in a variety of formats, for example, a list, grouped in rows and/or column, a flow diagram, or the like. Mobile device 15 may, in some cases, communicate display information for presentation by other devices, such as a tablet computer, a projector, an electronic billboard or other external device.

As described herein, mobile device 15, and the software executing thereon, provide a platform for creating and manipulating digital notes representative of physical notes 22. For example, in general, mobile device 15 is configured to process image data produced by image capture device 18 to detect and recognize at least one of physical notes 22 positioned within workspace 20. In some examples, the mobile device 15 is configured to recognize note(s) by determining the general boundary of the note(s). After a note is recognized, mobile device 15 extracts the content of at least one of the one or more notes, where the content is the visual information of note 22.

As further described below, mobile device 15 may implement techniques for automated detection and recognition of physical notes 22 and extraction of information, content or other characteristics associated with each of the physical notes. For example, mobile device 15 may allow user 26 fine-grain control over techniques used by mobile device 15 to detect and recognize physical notes 22. In accordance with the techniques described herein, mobile device 15 may implement techniques for automatic non-marker detection and recognition of physical notes 22 by processing the image data to find contours representing discontinuities in brightness or color. Moreover, as described in further detail below, mobile device 15 may utilize automated note extraction techniques that utilize shape and color features of the physical notes within the input image to recognize the physical notes. In one example implementation, a note management application executing on mobile device 15 may separate the input image into a plurality of color channels (spaces) and, for each of the color channels, separately apply edge detection to detect contours within the channelized image data. According to this multi-channel approach, polygons detected from the different channelized image data are detected, and polygons from the different channels potentially representing the same physical note are grouped and used to ultimately define the boundaries for an individual physical note. As a result, each of the plurality of digital notes generated by note management application 78 for a given input image may be represented by the best polygon detected for the respective digital note across a plurality of color channels. In another example implementation, a note management application executing on mobile device 15 may separate the input image, such as a gray scale input image, into a plurality of gray scale channels (spaces) and, for each of the gray scale channels, separately apply edge detection to detect contours within the channelized image data. According to this multi-channel grayscale approach, polygons detected from the different channelized image data are detected, and polygons from the different channels potentially representing the same physical note are grouped and used to ultimately define the boundaries for an individual physical note. In this way, the different color channels of the input image may represent different ranges of grayscale values associated with the input image.

In some example implementations, mobile device 15 provides functionality by which user 26 is able to export the digital notes to other systems, such as cloud-based repositories (e.g., cloud server 12) or other computing devices (e.g., computer system 14 or mobile device 16).

In the example of FIG. 1, mobile device 15 is illustrated as a mobile phone. However, in other examples, mobile device 15 may be a tablet computer, a personal digital assistant (PDA), a laptop computer, a media player, an e-book reader, a wearable computing device (e.g., a watch, eyewear, a glove), or any other type of mobile or non-mobile computing device suitable for performing the techniques described herein.

Figure 2:
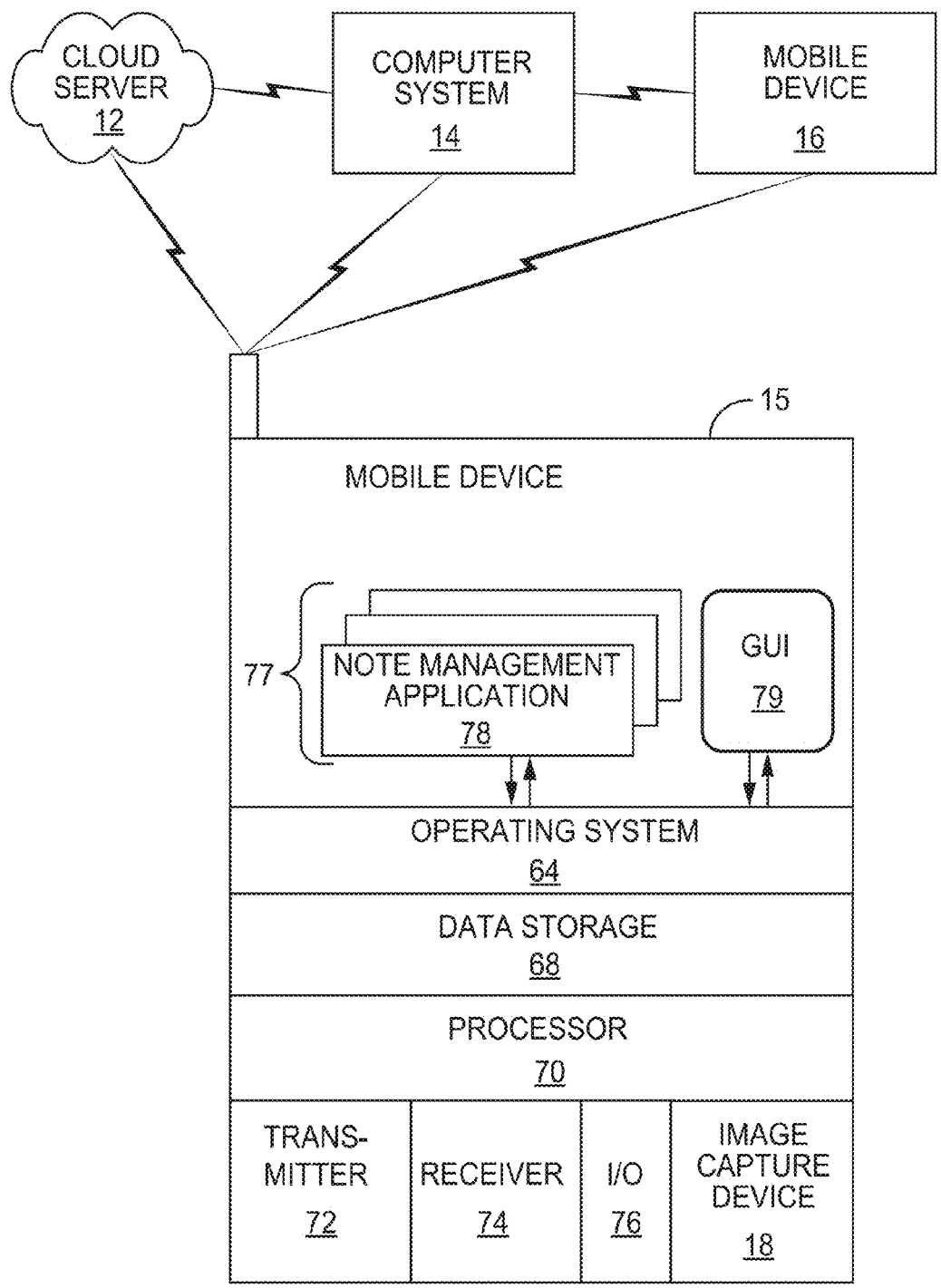
FIG. 2 is a block diagram illustrating one example of a mobile device.

FIG. 2 illustrates a block diagram illustrating an example of a mobile device that operates in accordance with the techniques described herein. For purposes of example, the mobile device of FIG. 2 will be described with respect to mobile device 15 of FIG. 1

In this example, mobile device 15 includes various hardware components that provide core functionality for operation of the device. For example, mobile device 15 includes one or more programmable processors 70 configured to operate according to executable instructions (i.e., program code), typically stored in a computer-readable medium or data storage 68 such as static, random-access memory (SRAM) device or Flash memory device. I/O 76 may include one or more devices, such as a keyboard, camera button, power button, volume button, home button, back button, menu button, or presentation device 28 as described in FIG. 1. Transmitter 72 and receiver 74 provide wireless communication with other devices, such as cloud server 12, computer system 14, or other mobile device 16 as described in FIG. 1, via a wireless communication interface as described in FIG. 1, such as but not limited to high-frequency radio frequency (RF) signals. Mobile device 15 may include additional discrete digital logic or analog circuitry not shown in FIG. 2.

In general, operating system 64 executes on processor 70 and provides an operating environment for one or more user applications 77 (commonly referred to "apps"), including note management application 78. User applications 77 may, for example, comprise executable program code stored in computer-readable storage device (e.g., data storage 68) for execution by processor 70. As other examples, user applications 77 may comprise firmware or, in some examples, may be implemented in discrete logic.

In operation, mobile device 15 receives input image data and processes the input image data in accordance with the techniques described herein. For example, image capture device 18 may capture an input image of an environment having a plurality of notes, such as workspace 20 of FIG. 1 having of notes 22. As another example, mobile device 15 may receive image data from external sources, such as cloud server 15, computer system 14 or mobile device 16, via receiver 74. In general, mobile device 15 stores the image data in data storage 68 for access and processing by note management application 78 and/or other user applications 77.

As shown in FIG. 2, user applications 77 may invoke kernel functions of operating system 64 to output a graphical user interface (GUI) 79 for presenting information to a user of mobile device. As further described below, note management application 78 may construct and control GUI 79 to provide an improved electronic environment for generating and manipulating corresponding digital notes representative of physical notes 22. For example, note management application 78 may construct GUI 79 to include a mechanism that allows user 26 to easily select digital notes from defined sets of digital notes recognized from the image data. In some example implementations, note management application 78 provides functionality by which user 26 is able to record and manage relationships between groups of the digital notes by way of GUI 79.

As described in further detail below, note management application 78 may utilize automated note extraction techniques that separate the input image into a plurality of channels and, for each of the channels apply edge detection to detect contours within the image data. According to the multi-channel approach, feature polygons are separately detected within each of the channelized versions of the input image and similar polygons between the channels that may correspond to the same physical note are grouped. Note management application 78 may, for example, detect a polygon from each of the channels that is likely to correspond to the same physical note and, based on a comparison of the polygons from the different color channels and/or gray scale channels, select a highest rank ("best") polygon to represent the physical note. In some examples, note management application may rank the polygons based on a comparison of the corners of detected edges for the polygons. As a result, each of the plurality of digital notes generated by note management application 78 for a given input image may be represented by the best polygon detected for the respective digital note across a plurality of channels.

Figure 3:
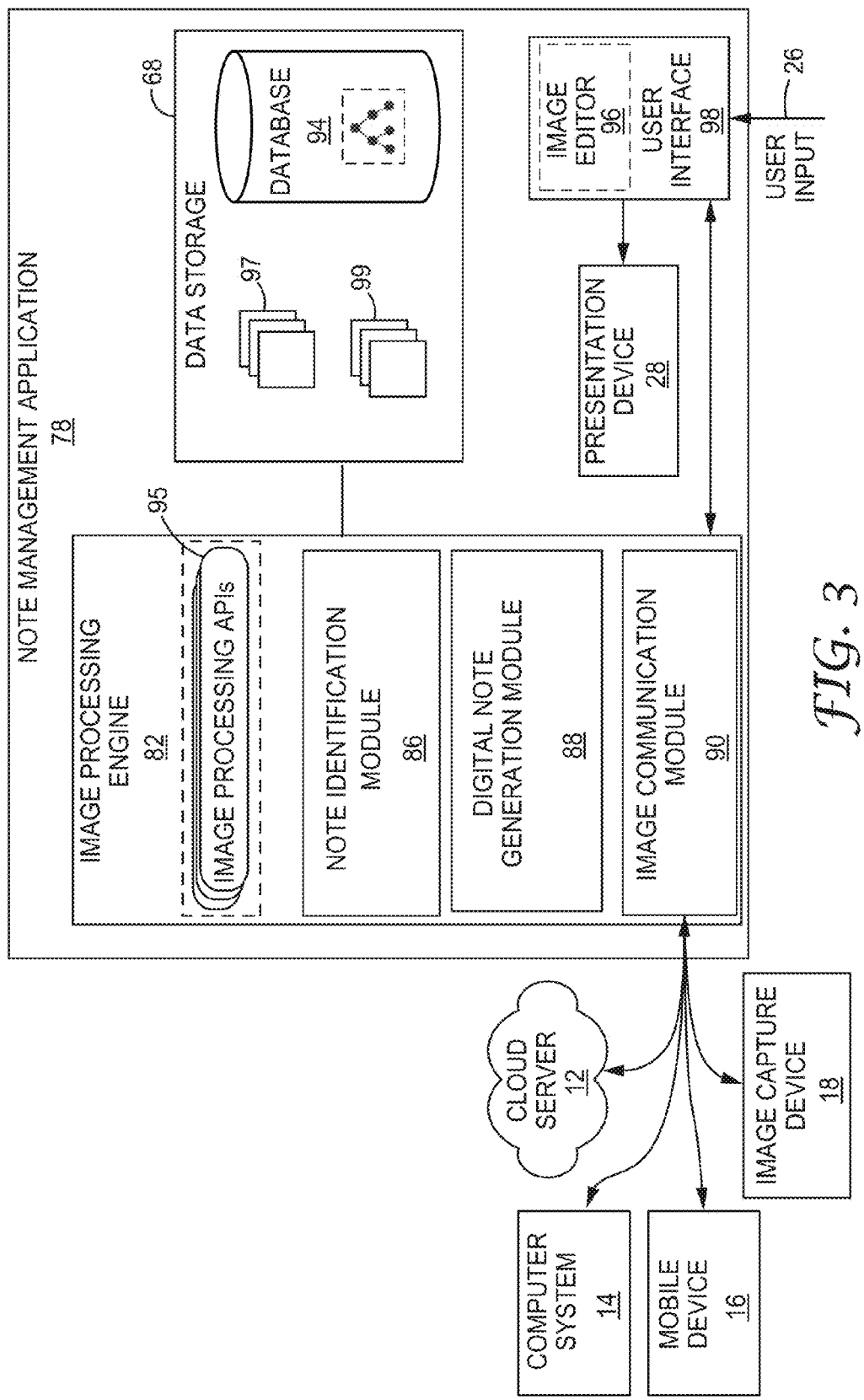
FIG. 3 is a block diagram illustrating one example of a user application to process the input image.

FIG. 3 illustrates a block diagram illustrating one example implementation of note management application 78 that operates in accordance with the techniques described herein. Although described as a user application 77 executing on mobile device 15, the examples described herein may be implemented on any computing device, such as cloud server 12, computer system 14, or other mobile devices.

In this example, user application 78 includes image processing engine 82 that provides image processing and object recognition functionality. Image processing engine 82 may include image communication module 90, note identification module 86 and digital note generation module 88. In addition, image processing engine 82 includes image processing Application Programming Interfaces (APIs) 95 that provide a library of image manipulation functions, e.g., image thresholding, masking, filtering, edge detection, and the like, for use by the other components of image processing engine 82.

In general, image data may be stored in data storage device 68. In this example, note management application 78 stores images 97 within data storage device 68. Each of images 97 may comprise pixel data for environments having a plurality of physical images, such as workspace 20 of FIG. 1.

As described herein, note identification module 86 processes images 97 and identifies (i.e., recognizes) the plurality of physical notes in the images. In accordance with the techniques described herein, note identification module utilizes automated note extraction techniques that separate the input image into a plurality of channels and, for each of the channels apply edge detection to detect contours within the image data. According to the multi-channel approach, polygons from each of the channels are detected and a best candidate polygon is selected for each of the detected physical notes.

Digital note generation module 88 generates digital notes 99 corresponding to the physical notes recognized within images 97. For example, each of digital notes 99 corresponds to one of the physical notes identified in an input image 97, and digital note generation module 88 utilizes for each of the digital notes a best candidate polygon from multiple color spaces. During this process, digital note generation module 88 may update database 94 to include a record of the digital note, and may store within the database information (e.g., content) captured from boundaries of the physical note within the input image as detected by note identification module 86. Moreover, digital note generation module 88 may store within database 94 metadata associating the digital notes into one or more groups of digital notes.

Image communication module 90 controls communication of image data between mobile device 15 and external devices, such as cloud server 12, computer system 14, mobile device 16, or image capture device 18. In some examples, image communication modules 90 may, for example, allow a user to communicate processed or unprocessed images 97 of environments and/or digital notes and associated information extracted therefrom including metadata from database 68. In some examples, image communication module 90 exports this data to a zip file that may be communicated by FTP, HTTP, email, Bluetooth or other mechanism.

In the example of FIG. 1, note management application 78 includes user interface 98 that constructs and controls GUI 79 (FIG. 2). User interface 98 may, in some examples, output for display an input image 97 overlaid with the plurality of digital notes 99, where each of the digital notes is overlaid in place of a corresponding physical note.

In some example implementations, user interface 98 provides an image editor 96 that allows a user 26 to edit the overlay image, the vector forms, the polygons, and/or the digital notes. In another example, digital note generation module 88 may include a process or processes that enhance the extracted information from the input image.

Additional example details of note management application 78 for detecting and recognizing physical notes are described in U.S. Patent Application 61/844,140, filed Jul. 9, 2013 entitled SYSTEMS AND METHODS FOR NOTE RECOGNITION AND MANAGEMENT USING COLOR CLASSIFICATION," U.S. Patent Application 61/844,152, filed Jul. 9, 2013, entitled "SYSTEMS AND METHODS FOR NOTE CONTENT EXTRACTION AND MANAGEMENT USING SEGMENTED NOTES, and U.S. Patent Application 61/844,176, filed Jul. 9, 2013, "SYSTEMS AND METHODS FOR NOTE CONTENT EXTRACTION AND MANAGEMENT BY SEGMENTING NOTES," the entire contents of each of which are incorporated herein by reference.

Figure 4A:
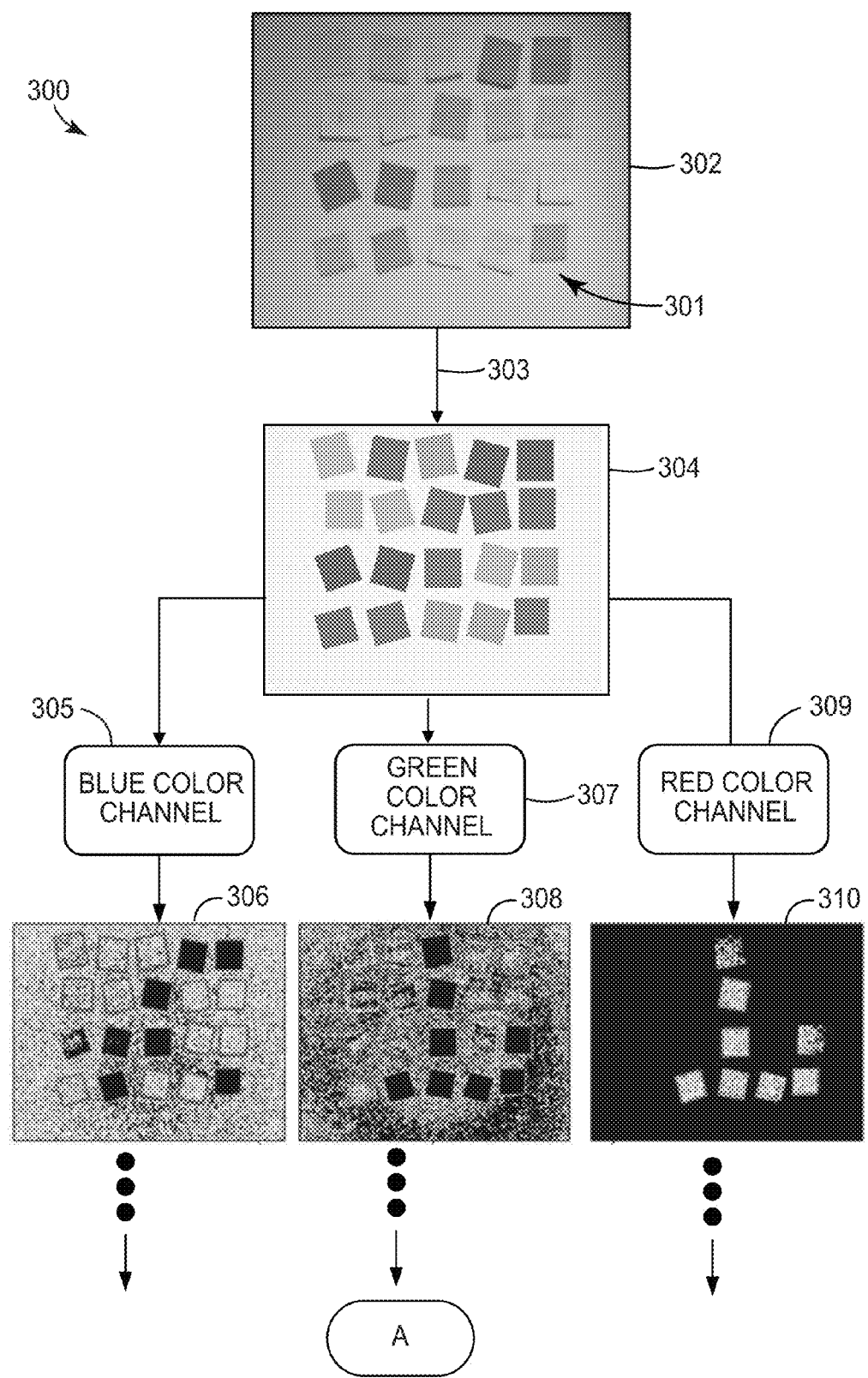
FIGS. 4A, 4B, and 4C are process diagrams illustrating example techniques for identifying contours in an input image and creating an overlay image with digital notes on the input image based on the identified contours.
Figure 4B:
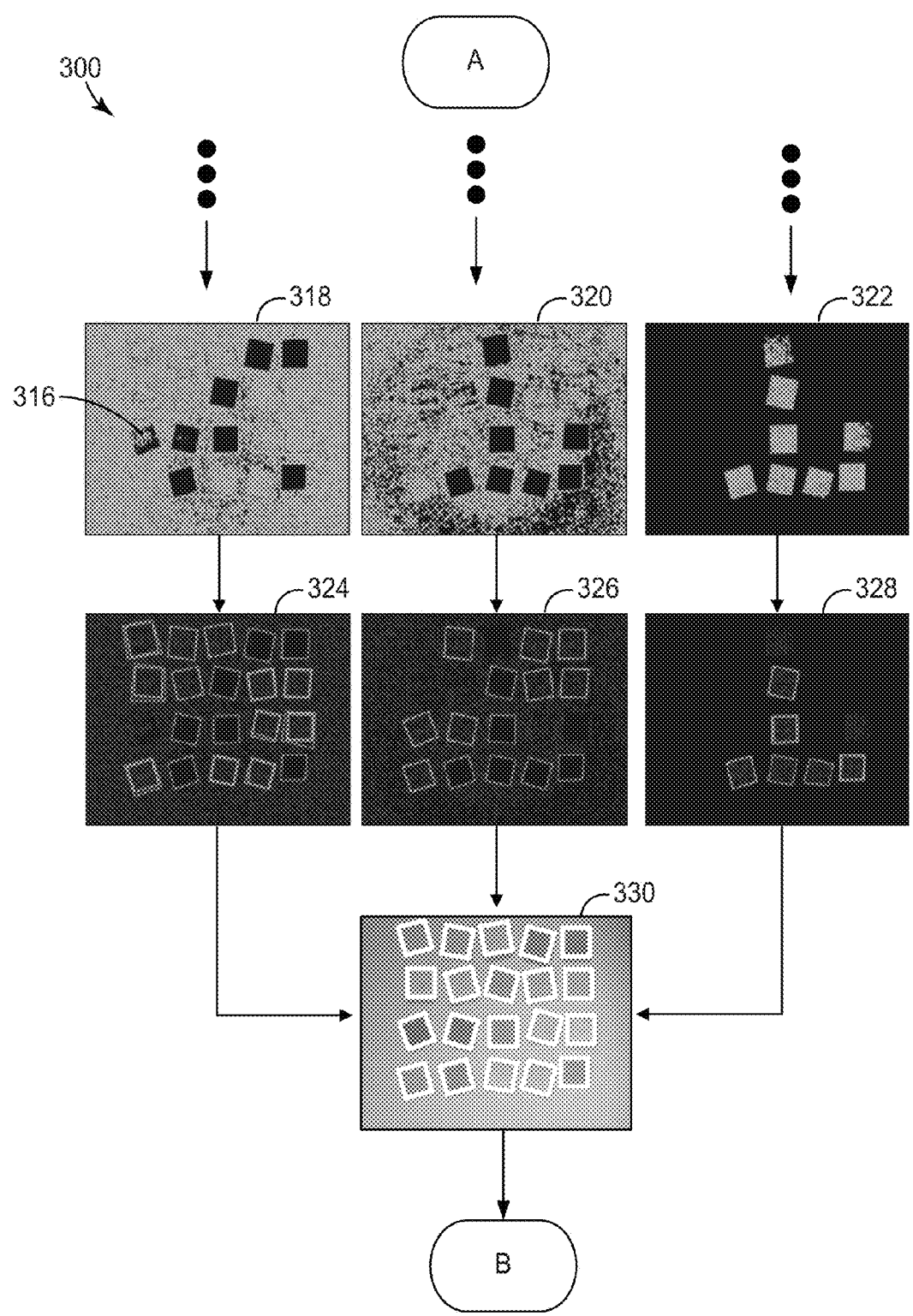
Figure 4C:
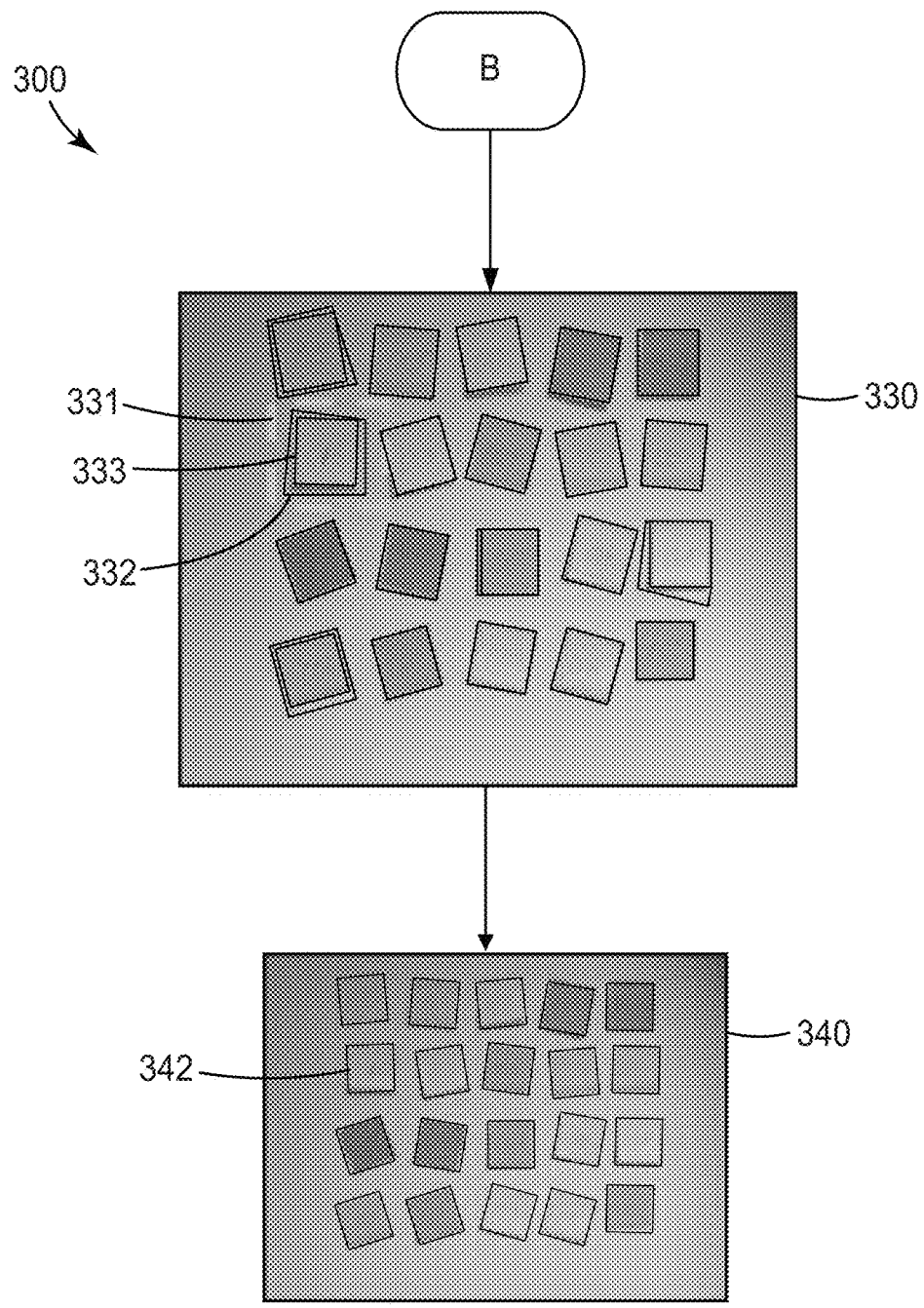

FIGS. 4A, 4B, and 4C are flow diagrams that illustrate an example process 300 of a non-marker-based detection algorithm in which an input image is processed into separate color channels and a representative polygon for each digital note, each digital note corresponding to a physical note detected in the different channelized versions of the image data, is selected from a set of candidate polygons.

As shown in FIG. 4A, note management application 78 of mobile device 15 receives an input image 302 of a workspace having a plurality of notes 301. Upon receiving input image 302, note management application 78 may pre-processes input image 302 to remove noise by, for example, normalizing 303 input image 302 to produce normalized image data 304 optimized for subsequent contour detection. One example of normalization 303 is application of a normalization operation in the L*a*b* color space (by maximizing the L* channel) and also the YUV color space (by minimizing the Y channel) to create normalized input image 304. L*a*b* may be advantageous to use since the color space may be more robust under many real-world conditions. The normalization technique of input image 302 may also be selected from a plurality of normalization techniques dynamically or automatically based on the properties of input image 302. In general, normalization 303 may be used to remove noise and shadows, yielding better input-to-edge detection and feature extraction, thereby improving note detection.

Upon normalization 303, note management application 78 may process normalized input image 304 to separate the normalized input image into a plurality of different color channels, such as blue color image data 305, green color image data 307, and red color image data 309. Each of image data 305, 307, 309 may be referred to herein as a channelized version of the input image 302.

Next, note management application 78 separately applies edge detection to each of the channelized version 305, 307, 309 of the input image to transform the input image and produce corresponding images 306, 308 and 310 in which detected edges are enhanced to aid subsequent feature extraction. In the example of FIG. 4A, note management application 78 applies Canny edge detection, which is a multi-stage process involving multiple filters. Application of edge detection within each color space 305, 307, 309 transforms the input image and produces resultant black and white images 306, 308, 310, where edges of notes 301 are enhanced.

Continuing to FIG. 4B, note management application 78 performs feature extraction on the resultant black and white images 306, 308, 310. That is, transformed images 306, 308, 310 for each of the different color channels is further processed to detect contours representing discontinuities in brightness or color, thereby converting black and white images 306, 308, 310 into contour images 318, 320, 322. During feature extraction, note management application 78 may identify corners of contours to generate vector forms, referred to herein as polygons or shapes 324, 326, 328, described by their corner points that approximate the contours representing discontinuities in brightness or color of different portions of the image. As a result, note management application 78 identifies each shape in the different channelized versions of the image data, and each shape is represented in vector forms such that the shapes (polygons) 324, 326, 328 are described by their corner points that approximate the contours representing discontinuities in brightness or color of different portions of the image.

Next, note management application 78 processes each polygon to remove any shapes that are asymmetrical or that do not match a pre-determined size criterion and/or criteria, such as noise contours 316. For example, note management application 78 may remove any polygons having vector data indicative of a non-square shape. As another example, note management application 78 may remove any polygons that significantly exceed or are significantly less than a pre-determined size criterion. This may be advantageous in reducing any false positives. Image 330 depicts, only for purposes of example, each remaining polygon overlaid on original input image 302.

As shown in FIG. 4C, note management application 78 further processes the identified polygons to determine groups of polygons that are substantially similar in size and orientation. In the example of FIG. 4C, note management application 78 identifies a group of polygons 331 in which polygons 332, 333 are substantially similar in size and orientation. For example, note management application 78 may determine that polygons 332, 333 are each substantially rectangular in shape and each of their four corners is within a threshold distance from the corresponding corner of the other polygon. As a result, note management application 78 identifies a plurality of sets of polygons, where each set of polygons corresponds to a different one of the physical notes in the input image. Moreover, each set of polygons comprises one or more polygons, each of the polygons being detected from a different one of the color channels.

After grouping the polygons, note management application 78 analyzes each set of polygons to select one of the polygons for each set to define the boundaries of the respective physical note and to represent the corresponding digital note. In some examples, selection of the polygon associated with the corresponding note from an array of notes 301 in input image 302 is based on an evaluation of the relative similarity of polygons to expected shapes of predetermined types of physical notes. For example, a best candidate polygon may be selected from a group of polygons after comparing each polygon and assigning scores to each polygon based on the symmetry of the polygon, e.g., how closely each of the corners of the vectors of the polygon approach a right angle. In this way, note management software 78 reduces each group of polygons, such as group 331, associated with a respective underlying physical note to one polygon.

Upon selecting a representative polygon for each physical note, note management software 78 creates a corresponding digital note (e.g., digital note 342) for which the selected polygon defines the shape and boundary of sub-images extracted for each of the digital notes from the input image. Note management software 78 constructs and outputs a graphical user interface in which sub-images associated with the digital notes are overlaid on the physical notes detected within the input image 302 to create final overlay image 340. In this way, the GUI presented by note management software 78 may depict a best candidate polygon for each of the digital notes, where the polygons may have been selected from a plurality of different color spaces.

In other examples, this shape-based detection and extraction utilizing a plurality of different color channels may include the use of a gray scale input image, lines to form rectangles/squares, intelligent thresholding, or segmentation to create blobs, machine learning techniques such as scale-invariant-feature-transform (SIFT), speeded-up-robust-features (SURF) trained on a set of sample images, and other such techniques. Moreover, other image processing techniques may be used in combination with the techniques described herein to improve the accuracy of detection and extraction of the physical notes. For example, the shape-based, multi-color channel techniques described herein may be augmented with color classification or segmentation techniques using operations such as an ensemble or voting-based classifier, Markov models, Bayesian statistics, and other such techniques.

Some classifiers are generative in nature while others are discriminative. In general, generative classifiers generate an individual model for each class (e.g., a color) and a queried pixel/group of pixels value is given a probability score as to whether it belongs to that class or not. Discriminative classifiers on the other hand model the boundary between two or more classes (2-class and multiclass classification respectively). Generative models provide easier generalizability to new classes (colors) that are not already modeled while separate discriminative models have to be retrained to every existing class (colors). Many examples of generative and discriminative classifiers are described in Christopher M. Bishop, 2006, Pattern Recognition and Machine Learning (Information Science and Statistics), Springer-Verlag New York, Inc., Secaucus, N.J., USA, the entire content of which is incorporated herein by reference. Some examples of generative models are naïve Bayes classifier, Gaussian Mixture Models and other probabilistic Bayesian models using Gaussian or other priors, and Dictionary Learning, such as those described in Michal Aharon, Michael Elad, and Alfred Bruckstein (2006), "K-SVD: An Algorithm for Designing Overcomplete Dictionaries for Sparse Representation", IEEE Transactions on Signal Processing 54 (11): 4311-4322), the entire content of which is incorporated herein by reference. Some examples of discriminative classification models are neural networks, Support Vector Machines, Decision Trees, Linear and Quadratic discriminate classification, logistic regression. Other example classification methods are neither generative nor discriminative e.g. nearest neighbor classification algorithm. In addition, the performance of any of the above mentioned classification models can be improved by ensemble learning algorithms that combine multiple instances of classification models mentioned above. Ensemble learning may be implemented as Bagging, Boosting, and their variants.

Figure 5:
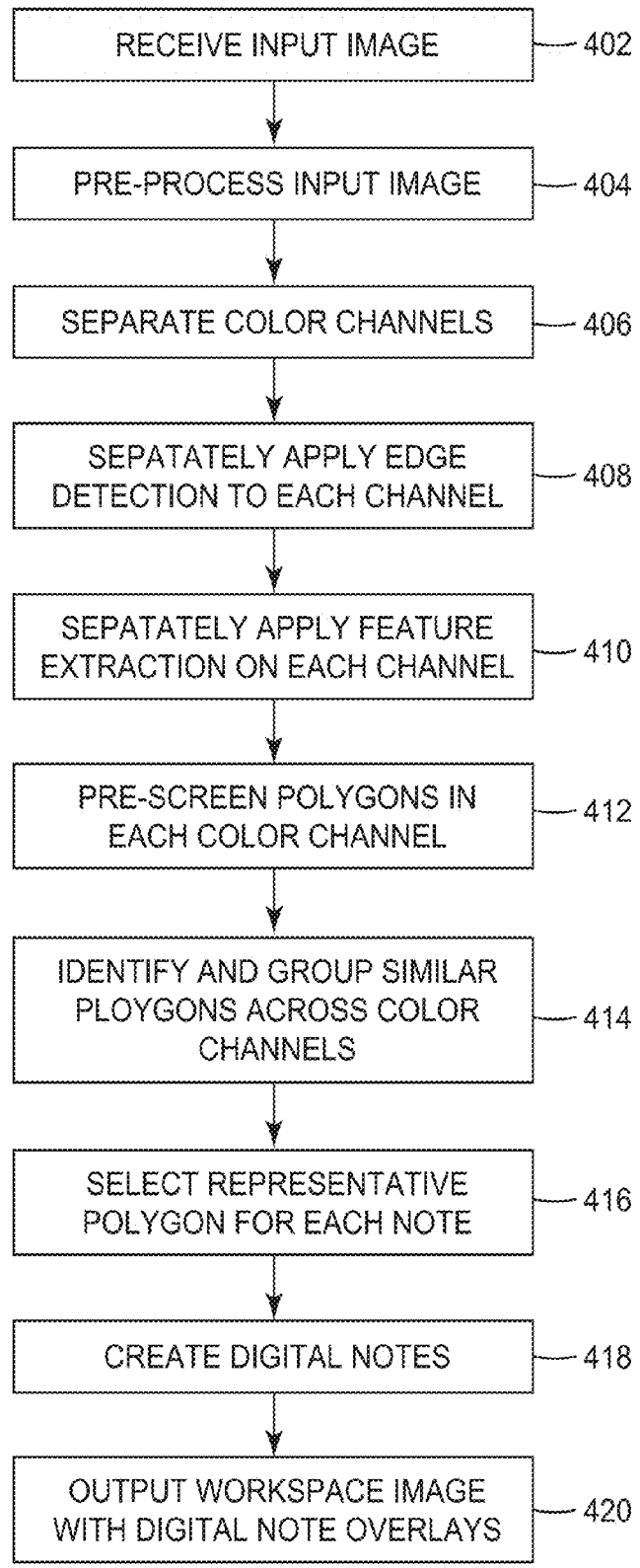
FIG. 5 is a flowchart illustrating example operation of a computing device in accordance with the techniques described herein.

FIG. 5 is a flowchart illustrating example operation of a computing device in accordance with the techniques described herein. For purposes of example, FIG. 5 will be described with respect to mobile device 15 of FIGS. 1-3.

Initially, note management application 78 of mobile device 15 receives an input image 302 of a workspace having a plurality of notes 301 (402). As described, the input image may be captured by image capture device 18 (e.g., a camera) of mobile device 15 or may be imported from cloud server 12 or another computing device, such as computer system 14 or mobile device 16.

Note identification module 86 of note management application 78 pre-processes the input image to remove noise by, for example, normalizing or thresholding the input image to produce normalized image data (404).

After pre-processing the input image, note identification module 86 may process the normalized input image to separate the normalized input image into a plurality of different color channels, such as blue color image data, green color image data, and red color image data (406).

Upon separating the image data into image data for each of the plurality of different colors, note identification module 86 separately applies edge detection to each of the channelized version of the input image to transform the input image and produce enhanced image data for each of the color channels (408). That is, the edges detected within the image data for each of the different colors are transformed to aid subsequent feature extraction.

Note identification module 86 performs feature extraction on the transformed image data for each of the different colors so as to identify, for each color channel, polygons contained within the different sets of color image data (410). During this process, note identification module 86 may construct data representing each shape in vector form representing the detected edges within the image data, e.g., discontinuities in brightness or color.

Note identification module 86 processes the polygons determined from the different color channel image data to pre-screen (discard) any shapes that do not match certain criteria (412). For example, note identification module 86 may discard polygons that are not substantially rectangular in shape, that are asymmetrical, or that do not match a predetermined size criterion and/or other criteria.

Next, note identification module 86 further processes the polygons associated with the different color channels to identify and group polygons of different color channels that are substantially similar in size, location, and orientation (414). After grouping the polygons, note identification module 86 analyzes each set of polygons to select one of the polygons as a representative polygon for the respective physical note and to be used with respect to the corresponding digital note (416). Upon selecting a representative polygon for each physical note, digital note generation module 88 creates a corresponding digital note for which the selected polygon defines the shape and boundary of sub-images extracted for each of the digital notes from the input image (418). In addition, user interface 98 constructs and outputs a graphical user interface in which sub-images associated with the digital notes are overlaid on the physical notes detected within the input image (420).

In other examples, this shape-based detection and extraction utilizing a plurality of different color channels may include the use of a gray scale input image, lines to form rectangles/squares, intelligent thresholding, or segmentation to create blobs, machine learning techniques such as scale-invariant-feature-transform (SIFT), speeded-up-robust-features (SURF) trained on a set of sample images, and other such techniques. Moreover, other image processing techniques may be used in combination with the techniques described herein to improve the accuracy of detection and extraction of the physical notes. For example, the shape-based, multi-color channel techniques described herein may be augmented with color classification or segmentation techniques using operations such as an ensemble or voting-based classifier, Markov models, Bayesian statistics, and other such techniques.

In this way, the system may create one or more respective digital notes representative of a corresponding one of the recognized physical notes. As one example, a record may be created to contain a plurality of database fields, including fields for storing the particular content of each color segment of the physical note. The system may associate the content extracted from the visual representation for a given physical note with the corresponding digital note representative of the physical note.

The techniques described in this disclosure may be implemented, at least in part, in hardware, software, firmware, or any combination thereof. For example, various aspects of the described techniques, including the disclosed mobile device 15, 16, cloud 12, and/or computer system 14, may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer-readable medium, such as a transitory or non-transitory computer-readable storage medium, containing instructions. Instructions embedded or encoded in a computer-readable medium, including a computer-readable storage medium, may cause one or more programmable processors, or other processors, such one or more processors included in a control system, to implement one or more of the techniques described herein, such as when instructions included or encoded in the computer-readable medium are executed by the one or more processors. Non-transitory computer-readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer-readable media. In some examples, an article of manufacture may comprise one or more computer-readable storage media.

Various examples of this disclosure have been described. These and other examples are within the scope of the following claims.

The invention claimed is:

1. A method comprising:
    receiving, by a computing device, an input image of an environment having a plurality of physical notes;
    separating, by the computing device, the input image into a plurality of channelized input images, each of the channelized input images associated with a different color;
    generating, by the computing device, a plurality of transformed channelized input images by applying edge detection to each of the plurality of channelized input images;
    processing, by the computing device, the plurality of transformed channelized input images to identify, based on edges detected within the transformed channelized input images, a plurality of polygons corresponding to the physical notes within the input image;
    grouping, by the computing device, the plurality of polygons from the plurality of transformed channelized input images into a plurality of groups, each of the groups comprising one or more of the polygons and corresponding to different one of the physical notes; and selecting, by the computing device, a representative one of the polygons from each of the plurality of groups for each respective physical note in the input image.

2. The method of claim 1 further comprising generating, by the computing device, a plurality of digital notes based on the identified data of the plurality of representative polygons, wherein the identified data includes the shape and boundary of sub-images extracted for each digital note in the plurality of digital notes from the input image.

3. The method of claim 1 further comprising displaying, by the computing device, the plurality of digital notes on a graphical user interface, wherein the plurality of digital notes are overlaid on the plurality of physical notes within the input image.

4. The method of claim 1, further comprising:
generating, by the computing device, an overlay image including the plurality of digital notes overlaid on the plurality of physical notes within the input image; and
storing, by the computing device, the overlay image to a digital data storage device for retrieval by a user.

5. The method of claim 1, further comprising, prior to processing the input image to separate the input image into a plurality of different color channels, normalizing the input image to create a normalized input image to remove noise and shadows from the input image.

6. The method of claim 5, wherein normalizing further includes thresholding the input image to remove noise and shadows from the input image.

7. The method of claim 1, wherein grouping, by the computing device, the plurality of polygons comprises grouping the polygons from the different color channels based on size, location, and orientation.

8. The method of claim 1, wherein the plurality of different color channels comprises at least one of a group consisting of:
a blue color channel;
a green color channel; and
a red color channel.

9. The method of claim 1, wherein selecting, by the computing device, a representative one of the polygons further comprises analyzing the plurality of polygon sets to select one polygon in each polygon set as a representative polygon.

10. The method of claim 9, wherein analyzing the plurality of polygon sets to select one polygon in each polygon set as a representative polygon includes selecting the polygon associated with the respective physical note in the input image based on an evaluation of the relative similarity of each polygon in the polygon set to an expected shape of the corresponding note in the input image.

11. The method of claim 9, wherein analyzing the plurality of polygon sets to select one polygon in each polygon set as a representative polygon includes selecting the polygon associated with the respective physical note in the input image based on a comparison of the symmetry of each polygon in the polygon set,
wherein the comparison of the symmetry is based on a score assigned by the computing device to each polygon in the polygon set, and wherein the polygon with the highest score is selected as the representative polygon.

12. The method of claim 1, further comprising removing, by the computing device, one or more of the polygons that do not match criteria,
wherein the criteria includes pre-determined size of the polygon or a requirement for a substantially rectangular shape.

13. The method of claim 1, wherein the input image comprises at least one of a group consisting of:
a digital image;
a digital video; and
a continuous digital scan.

14. The method of claim 1, wherein the input image comprises a gray scale image and each of the different colors comprise a different range of grayscale values.

15. The method of claim 1, wherein the plurality of physical notes in the input image comprises at least one of a group consisting of:
a 7.62 by 7.62 centimeter (cm) note;
a 66.04 by 99.06 cm poster;
a triangular metal sign;
a sticker;
a legal size sheet of paper;
an A3 size sheet of paper;
an A4 size sheet of paper; and
a 8.5 by 11 inch sheet of paper.

16. A computing device comprising:
a processor; and
a note identification module executable on the processor and configured to separate an input image into a plurality of channelized input images, each of the channelized input images associated with a different color,
wherein the note identification module is configured to apply edge detection and feature extraction to identify polygons within each of the channelized input images, and
wherein the note identification module is configured to select, from the polygons from the channelized input images, a representative polygon for each of the physical notes in the input image.

17. The device of claim 16 further comprising a digital note generation module configured to generate a respective digital note for each of the physical notes based on the corresponding representative polygon, wherein the representative polygon defines a shape and boundary of a sub-image extracted from the input image for the respective digital note.

18. The device of claim 16 wherein the computing device is configured to display the plurality of digital notes on a graphical user interface, and wherein the plurality of digital notes overlay the plurality of physical notes within the input image.

19. The device of claim 16 further comprising, a digital data storage device configured to store an overlay image for retrieval by a user.

20. The device of claim 19, wherein the overlay image includes the plurality of digital notes overlaid on the plurality of physical notes in the input image.

21. The device of claim 16, wherein the note identification module is further configured to normalize the input image to remove noise and shadows from the input image.

22. The device of claim 16, wherein the plurality of different color channels comprises at least one of a group consisting of:
a blue color channel;
a green color channel; and
a red color channel.

23. The device of claim 16, wherein the note identification module is further configured to select the polygon associated with the respective physical note in the input image based on an evaluation of the relative similarity of the polygons to an expected shape of the corresponding note in the input image.

24. A computer system having at least one processor configured to:
receive an input image of an environment having a plurality of physical notes;

separate the input image into a plurality of channelized input images, each of the channelized input images associated with a different color;
generate a plurality of transformed channelized input images by applying edge detection to each of the plurality of channelized input images;
process the plurality of transformed channelized input images to identify, based on edges detected within the transformed channelized input images, a plurality of polygons corresponding to the physical notes within the input image;
group the plurality of polygons from the plurality of transformed channelized input images into a plurality of groups, each of the groups comprising one or more of the polygons and corresponding to different one of the physical notes; and
select a representative one of the polygons from each of the plurality of groups for each respective physical note in the input image.

25. A non-transitory computer readable medium comprising instructions that cause a programmable processor to:
receive an input image of an environment having a plurality of physical notes;
separate the input image into a plurality of channelized input images, each of the channelized input images associated with a different color;
generate a plurality of transformed channelized input images by applying edge detection to each of the plurality of channelized input images;
process the plurality of transformed channelized input images to identify, based on edges detected within the transformed channelized input images, a plurality of polygons corresponding to the physical notes within the input image;
group the plurality of polygons from the plurality of transformed channelized input images into a plurality of groups, each of the groups comprising one or more of the polygons and corresponding to different one of the physical notes; and
select a representative one of the polygons from each of the plurality of groups for each respective physical note in the input image.

\* \* \* \* \*